United States Patent
Narumi et al.

[11] Patent Number: 6,118,811
[45] Date of Patent: Sep. 12, 2000

[54] SELF-CALIBRATING, SELF-CORRECTING TRANSCEIVERS AND METHODS

[75] Inventors: Robert T. Narumi, Dove Canyon; Lloyd F. Linder, Agoura Hills; Erick M. Hirata, Torrance; Don C. Devendorf, Carlsbad; Matthew S. Gorder, Riverside; Phung N. Phan, Simi Valley; Ricky Y. Chen, Irvine, all of Calif.

[73] Assignee: Raytheon Company, Lexington, Mass.

[21] Appl. No.: 08/903,807

[22] Filed: Jul. 31, 1997

[51] Int. Cl.[7] ........................................................ H04B 1/38
[52] U.S. Cl. ............................................. 375/219; 455/84
[58] Field of Search ................................. 375/219, 344; 455/83, 84, 87, 88, 73, 78, 69, 70

[56] References Cited

U.S. PATENT DOCUMENTS

| | | | |
|---|---|---|---|
| 4,817,192 | 3/1989 | Phillips et al. | 455/75 |
| 4,968,968 | 11/1990 | Taylor | 342/174 |
| 5,175,872 | 12/1992 | Borras | 455/76 |
| 5,303,394 | 4/1994 | Hrncirik | 455/84 |
| 5,363,402 | 11/1994 | Harmon | 455/78 |
| 5,444,865 | 8/1995 | Heck et al. | 455/86 |
| 5,835,850 | 8/1996 | Kumar | 455/67.4 |

OTHER PUBLICATIONS

Toner M. F., et al., "On the Practical Implementation of Mixed Analog–Digital BIST", IEEE 1995 Custom Integrated Circuits Conference, Mar., 1991, pp. 525–528.

*Primary Examiner*—Chi H. Pham
*Assistant Examiner*—Emmanuel Bayard
*Attorney, Agent, or Firm*—Leonard A. Alkov; William C. Schubert; Glenn H. Lenzen, Jr.

[57] ABSTRACT

A transceiver has a digital signal processor which can insert calibration signals of known level and frequency into transmitters for calibration and correction of transmitter parameters. An output of the calibrated and corrected transmitter is subsequently coupled into a calibration mixer along with a mixing signal (e.g., from a local oscillator generator. The outputs of the calibration mixer have known levels and frequencies and are inserted into receivers for calibration and correction of receiver parameters.

33 Claims, 5 Drawing Sheets

SELF-CALIBRATING, SELF-CORRECTING TRANSCEIVERS AND METHODS

BACKGROUND OF THE INVENTION

1. Field of the Invention

The present invention relates generally to transceivers and, more particularly, to built-in calibration structures for transceivers.

2. Description of the Related Art

The flexibility, power and performance of digital transceivers have caused them to become an essential part of mobile radio systems, cellular telephone systems, paging systems, automotive entertainment systems and military communications.

Digital transceivers are typically complex systems and their performance is a function of a number of system parameters (e.g., transmitter gain, receiver gain, receiver noise, receiver intermodulation distortion and receiver dynamic range). Periodic monitoring and recalibration of these parameters is desirable if transceiver performance is to be maintained at a high level.

Monitoring and recalibration costs can be greatly reduced if the transceiver includes significant built-in test and calibration structures. These structures can also reduce initial manufacturing cost because they can expose problems at early manufacturing stages and can reduce the need for expensive test equipment. These structures can also enhance customer satisfaction because they reduce the cost and time required to maintain transceivers in a high-performance state.

Various built-in, self-test (BIST) systems have been proposed. For example, a BIST system for mixed analog-digital (MAD) structures was described by M. F. Toner, et al. (Toner M. F., et al., "On the Practical Implementation of Mixed Analog-Digital BIST", *IEEE* 1995 *Custom Integrated Circuits Conference,* March, 1991, pp. 525–528). In this BIST system, a precision analog test stimulus was generated with an over-sampling oscillator. The test stimulus included single and/or multiple sine-waves with digitally-programmable amplitudes, frequencies and phases. The analog output was imbedded in a pulse-density modulated digital bit stream.

Measurement of responses to the test stimulus was facilitated with an analog-to-digital converter (ADC) whose output was coupled through a narrow-band digital filter. Analog signal and noise powers were extracted by applying analog waveforms to the ADC, selecting a passband frequency for the digital filter and computing the sum of squares of samples emerging from the filter.

In a sequence of operations, the oscillator was used to calibrate the ADC which was then used to measure analog signals. Toner, et al. suggested that the ADC could be used to calibrate an analog-to-digital converter (DAC) and the two converters used as a precision analog stimulus and volt-meter.

Although the suggestion of an ADC and a DAC as analog stimulus and volt-meter is helpful, it fails to enable the calibration and correction of complex systems such as transceivers.

SUMMARY OF THE INVENTION

The present invention is directed to a self-calibrating, self-correcting transceiver. This goal is achieved with a signal processor which can inject calibration signals of known levels and frequencies into transmitters of the transceiver for calibration and correction of transmitter parameters. Subsequently, transmitter signals from a calibrated transmitter and mixing signals from another signal source (e.g., a local oscillator generator) are applied to inputs of a calibration mixer. Outputs of this mixer have known known levels and frequencies and are injected into receivers of the transceiver for calibration and correction of receiver parameters. The signal processor measures responses of the transmitters and receivers and parameter corrections are communicated to the transmitters and receivers from a controller.

In an exemplary calibration and correction method, transmitter calibration signals are sent through a transmitter, responses to the calibration signals are monitored and transmitter responses corrected if necessary. Subsequently, a calibrated transmitter signal is mixed with a mixing signal to generate receiver calibration signals which are injected into a receiver. Receiver responses to the calibration signals are monitored and receiver responses corrected if necessary.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figure 2:
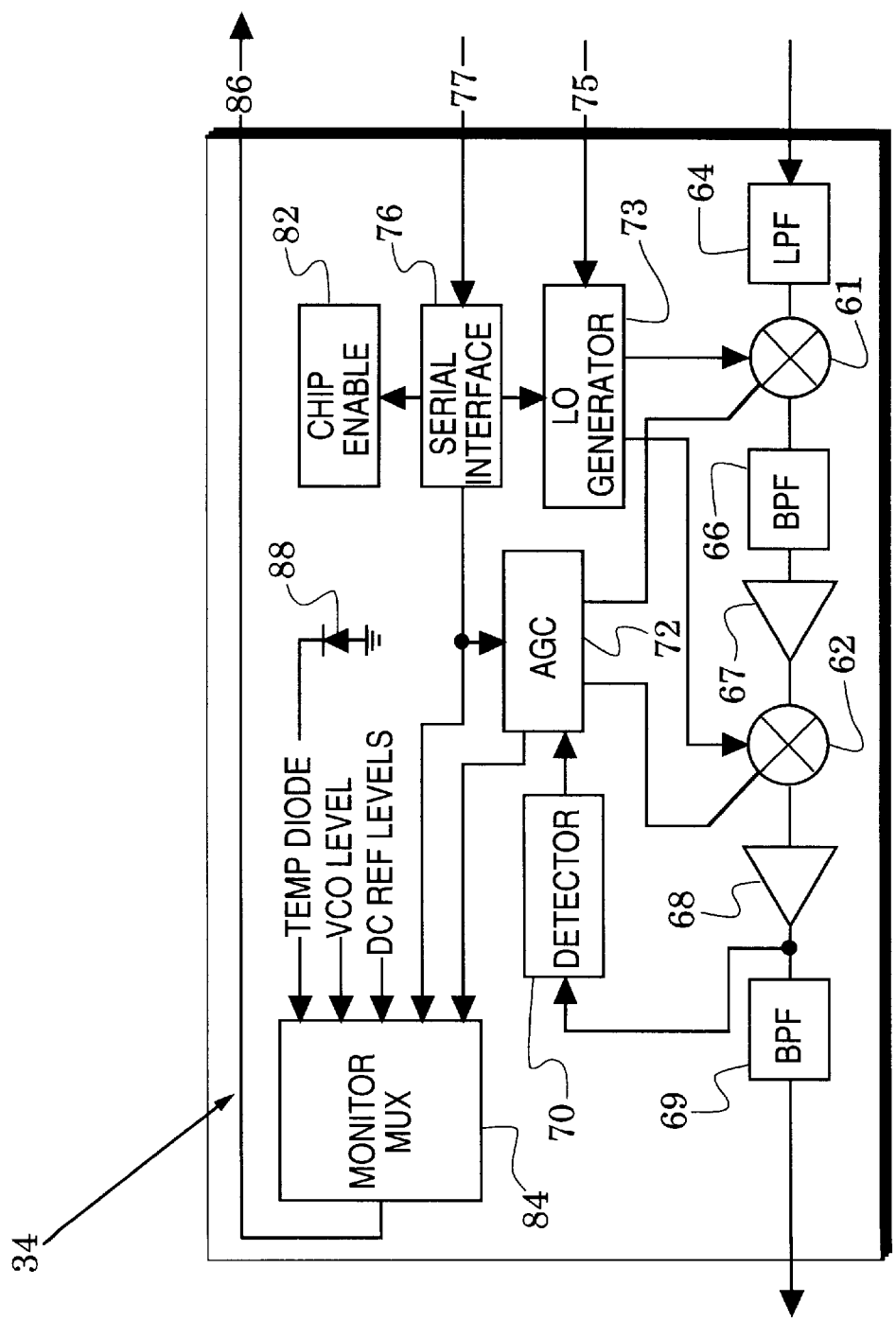
FIG. 2 is a block diagram of transmitter details in the transceiver of FIG. 1.
Figure 3:
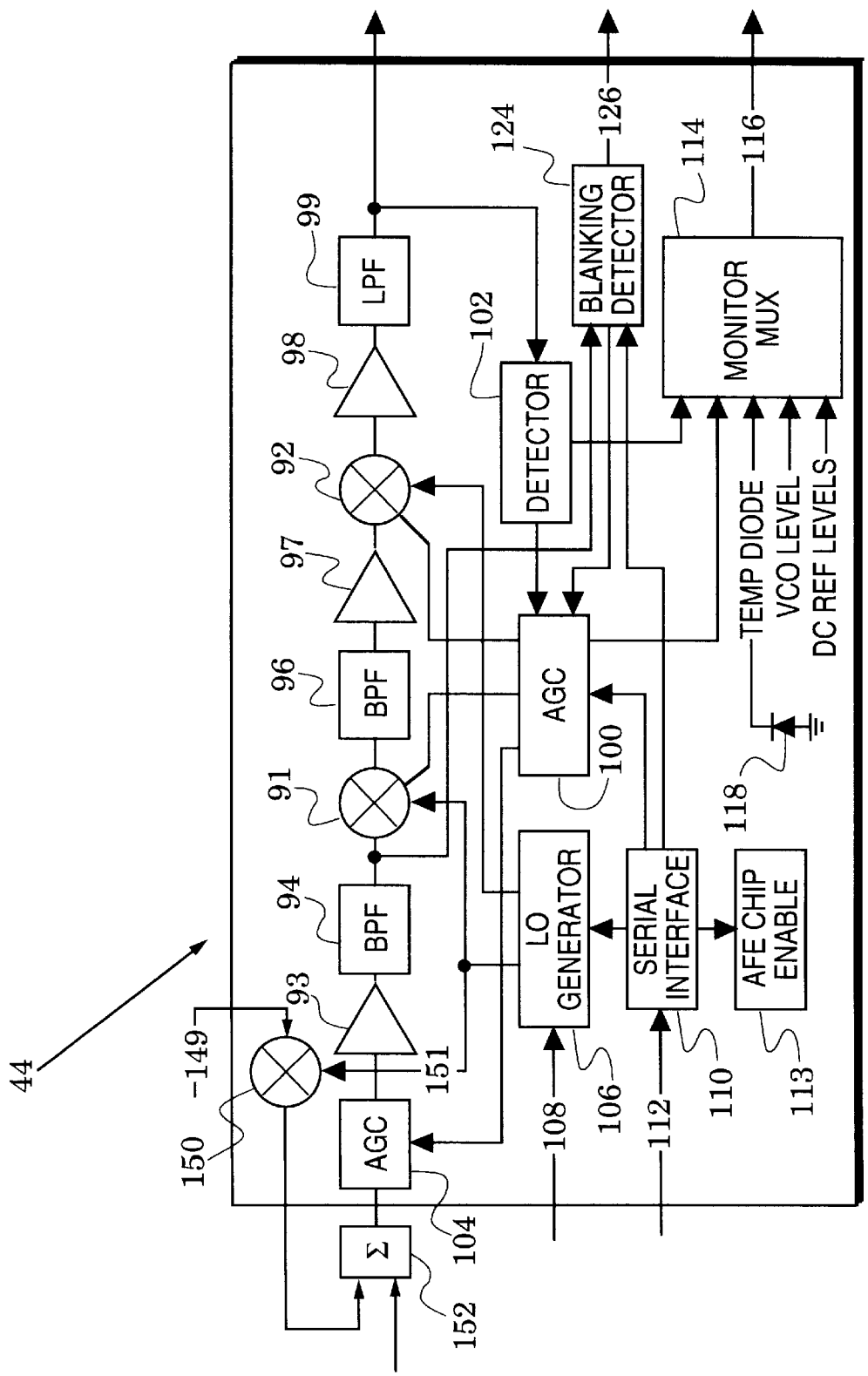
FIG. 3 is a block diagram of receiver details in the transceiver of FIG. 1.
Figure 4:
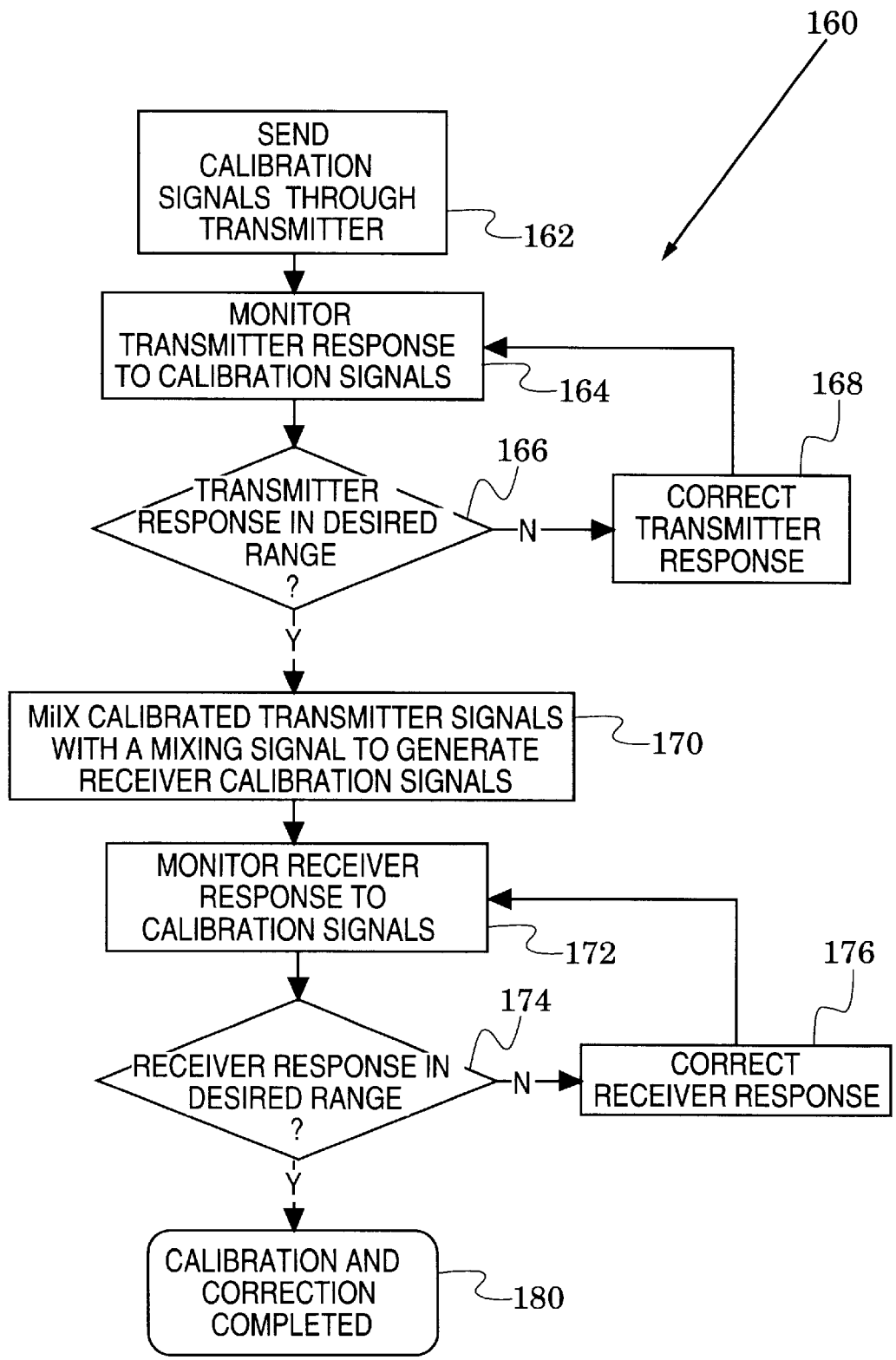
FIG. 4 is a flow chart which illustrates process steps in calibration and correction of the transceiver of FIG. 1.

A self-calibrating, self-correcting transceiver 20 is shown in FIGS. 1, 2, 3 and 5 and an exemplary calibrating and correcting process for the transceiver is shown in FIG. 4. The transceiver 20 is structured to facilitate insertion of calibration signals with known levels and frequencies into its transmitters and receivers. The transceiver is further structured to measure the transmitter and receiver responses to these calibration signals and to facilitate any required corrections of transceiver parameters.

Figure 1:
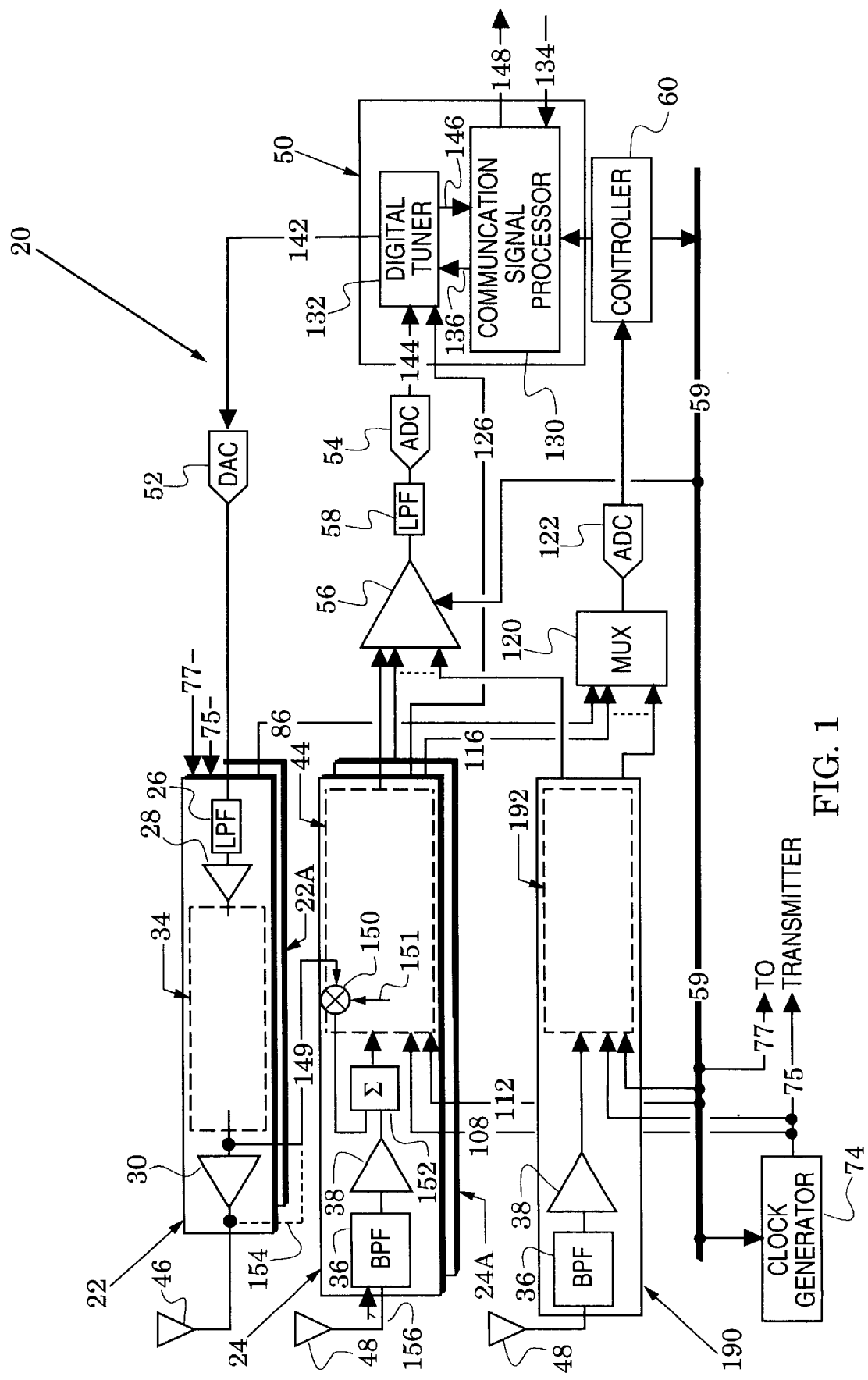
FIG. 1 is a block diagram of a self-calibrating, self-correcting transceiver in accordance with the present invention.

A description of the process of FIG. 4 is preceded by the following description of the transceiver 20 of FIGS. 1, 2 and 3. After the process description, another receiver embodiment is described with reference to FIG. 5.

The transceiver 20 of FIG. 1 includes at least one transmitter 22 (other transmitters are exemplified by a second transmitter 22A) and at least one receiver 24 (other receivers are exemplified by a second receiver 24A and a receiver 190).

In the transmitter 22, a transmitter input is formed by a serial combination of a low-pass filter 26 and a video amplifier 28. A transmitter output is taken from a high-power amplifier (HPA) 30. In an exemplary fabrication process which enhances transceiver miniaturization, a major portion of the transmitter is carried on an integrated circuit 34.

In the receiver 24, a receiver input is formed by the serial combination of a band-pass filter 36 and a low-noise amplifier (LNA) 38. Similar to the transmitter 22, a major portion of the receiver 24 is carried on an integrated circuit 44. For clarity of illustration, the details of the integrated circuits 34 and 44 are shown respectively in FIGS. 2 and 3 and will be described hereinafter.

Although the transmitters and receivers can share antennas, they are preferably each coupled to a respective antenna. Thus, the output of the transmitter 22 is coupled to an antenna 46 and the input of the receiver 24 is coupled to an antenna 48.

The inputs of the transmitters and the outputs of the receivers are connected to a signal processor 50. The flexibility of modern communication systems (e.g, systems which process signal modulations such as binary phase shift keying, quadrature phase shift keying and π/4 quadrature phase shift keying) is enhanced by the use of digital processing. Accordingly, the signal processor 50 is preferably a digital signal processor and it is coupled to each transmitter input by a respective digital-to-analog converter (DAC) 52 (for simplicity of illustration, only one is shown) and coupled to the receiver outputs by an analog-to-digital converter (ADC) 54. In particular, the receiver outputs are connected to the analog-to-digital converter 54 through a serial combination of a summing amplifier 56 and a low-pass filter 58. The signal processor 50 is associated with a controller 60 and the transmitters and receivers are coupled to the controller 60 over a control bus 59.

As detailed in FIG. 2, the transmitter's integrated circuit 34 has first and second mixers 61 and 62 for double upconversion of video signals from the transmitter video amplifier (28 in FIG. 1). A low-pass filter 64 precedes the first mixer 61 and a band-pass filter 66 and an intermediate-frequency amplifier 67 are positioned between the first and second mixers 61 and 62. A radio-frequency amplifier 68 and a bandpass filter 69 connect the second mixer 62 to the transmitter's HPA (30 in FIG. 1).

The first and second mixers 61 and 62 are of a mixer type (e.g., Gilbert mixers) whose gain is responsive to a control signal. A feedback system comprising a serially-connected logarithmic detector 70 and an automatic gain control (AGC) circuit 72 is connected between the output of the HPA 30 and the first and second mixers 61 and 62. The gain of the transmitter 22 is stabilized by this feedback system. The gain can be adjusted through commands to the AGC circuit 72.

The upconversion frequencies for the first and second mixers 61 and 62 are provided by a local oscillator (LO) generator 73. The adaptability of the transmitter 22 is enhanced if its output frequency is selectable from a band of frequencies. Accordingly, the LO generator outputs are each tunable over a frequency band. In an exemplary tunable LO generator, a plurality of frequency steps are generated with phase-lock loops which are locked in selectable divide-by ratios to a voltage-controlled oscillator which, in turn, is locked by selectable ratios to a reference. In the transceiver 20, this reference is provided by a clock generator 74 which is shown in FIG. 1. The clock signal is coupled to the LO generator 73 over a clock line 75.

In the integrated circuit 34, the AGC circuit 72 and the LO generator 73 are connected to a serial interface 76 which, in turn, is connected through a control line 77 and the control bus to the controller (59 and 60 in FIG. 1). Through the serial interface 76, the controller can also communicate with a chip enable circuit 82 which applies operating power to the integrated circuit. With signals to the chip enable circuits of the transmitters, the controller (60 in FIG. 1) can enable any selected one of the transmitters.

The transmitter 22 has a monitor multiplexer (MUX) 84 which sends a plurality of monitor signals from the transmitter to the controller 60 via a MUX line 86. For example, a temperature diode 88 reports the transmitter temperature (e.g., the temperature of the integrated circuit chip 34). Other monitor signals include a signal that indicates the frequency of a voltage-controlled oscillator in the LO generator 73, AGC levels from the AGC circuit 72 and various DC voltage supply levels. These monitor signals are communicated to the controller 60 by the monitor MUX 84 which is responsive to controller commands via the serial interface 76.

As detailed in FIG. 3, the receiver's integrated circuit 44 has first and second mixers 91 and 92 for double downconversion of a radio-frequency signal from the LNA (38 in FIG. 1). A radio-frequency amplifier 93 and and a bandpass filter 94 precedes the first mixer 91 and a bandpass filter 96 and an intermediate-frequency amplifier 97 are positioned between the first and second mixers 91 and 92. A video amplifier 98 and a low-pass filter 99 connect the second mixer 92 to the receiver output.

Similar to the transmitter mixers (61 and 62 of FIG. 2), the gains of the first and second mixers 91 and 92 are responsive to a control signal. In addition, the integrated circuit 44 has an AGC module 100 (e.g., a pin diode) which is positioned ahead of the radio-frequency amplifier 93 and which is also responsive to a control signal. A feedback system controls the receiver gain. It comprises a serially-connected logarithmic detector 102 and an AGC circuit 104 which are connected between the output of the integrated circuit 44 and the first and second mixers 91 and 62 and the AGC module 104.

The upconversion signals for the first and second mixers 91 and 92 are provided by a LO generator 106 which is similar to the transmitter's LO generator (73 in FIG. 2). A reference frequency for this LO generator is also provided by the clock generator 74 over a clock line 108.

The AGC circuit 104 and the LO generator 106 are connected to a serial interface 110 which, in turn, is connected through a control line 112 and the control bus to the controller (59 and 60 in FIG. 1). Through the serial interface 110, the controller can communicate with a chip enable circuit 113 on each receiver and, thereby, enable a selected one of the receivers.

The receiver 24 also has a monitor MUX 114 which sends a plurality of monitor signals to the controller 60 via a MUX line 116. Similar to the transmitter, these monitor signals include one from a temperature diode 118, a signal that indicates the frequency of a voltage-controlled oscillator in the LO generator 106, AGC levels from the AGC circuit 100 and various DC voltage supply levels. These monitor signals are communicated to the controller 60 by the monitor MUX 114 which is responsive to controller commands via the serial interface 110.

Because the MUX signals from the transmitter 22 and the receiver 24 are typically analog, they are communicated to the controller 60 (which is typically digital) through a MUX 120 and an analog-to-digital converter 122 (as illustrated in FIG. 1). A blanking detector 124 is coupled ahead of the first mixer 91 to monitor for the presence of interference signals. This detector is responsive to the controller 60 via the serial interface 110 and can send a blanking signal over a blanking line 126 to the signal processor 60 (as also illustrated in FIG. 1).

Having described details of the integrated circuits 34 and 44 of the transmitter 22 and receiver 24, attention is returned to FIG. 1. In an exemplary embodiment, the signal processor 50 includes a communication signal processor 130 and a digital tuner 132. The communication signal processor is configured to convert an input digital bit stream 134 into modulated in-phase and quadrature (I/Q) baseband samples 136 which are coupled to the digital tuner.

This modulation is typically selectable from various communication modulations (e.g., binary phase shift keying, quadrature phase shift keying and $\pi/4$ quadrature phase shift keying). The modulated I/Q baseband samples 136 are processed by the digital tuner 132 into a digital signal 142 having a selected frequency rate and this signal is coupled to the transmitter 22 through the DAC 52. Preferably, the communication signal processor 130 and tuner 132 are configured with multiple channels so that respective DAC's (not shown) couple signals to the other transmitters (as exemplified by transmitter 22A).

On a receive path, baseband signals from receivers, e.g., receivers 24, 24A and 190, are summed in amplifier 56 and coupled to the digital tuner 132 through a common ADC 54. The tuner 132 splits the digitized baseband signals 144 into I/Q components 146 from which the communication signal processor 130 recovers an output data stream 148. Preferably, the communication signal processor 130 and tuner 132 have multiple processing channels so they simultaneously process signals from multiple receivers. Although many other transceiver embodiments may be used with the teachings of the invention, one structured with a common ADC (as shown in FIG. 1) reduces costs because high-performance ADC's are typically an expensive item.

FIG. 1 shows that signals from the transmitter 22 are coupled over a signal line 149 to one input of a calibration mixer 150. Another input of the calibration mixer 150 is coupled over a signal line 151 from a signal source that is preferably responsive to the controller 60. In the transceiver embodiment 20, this signal source is the receiver's LO generator 106 as shown in FIG. 3. The output of the calibration mixer 150 is coupled through a summer 152 to the input of the receiver's integrated circuit 44.

In other transceiver embodiments, the input to the calibration mixer 150 can be taken from the output of the transmitter, i.e., from the output of the HPA 30 as indicated by the broken line 154 in FIG. 1. Although the output of the summer 152 can be injected into the receiver input as indicated by the signal arrow 156 in FIG. 1, the receiver's noise figure is enhanced if the insertion loss of the summer 152 is positioned after the LNA 38.

In operation of the transceiver 20, a modulated, baseband signal 142 from the digital tuner 132 is coupled through the DAC 52 to the transmitter 22 where it is amplified, filtered and upconverted and passed to the antenna 46 for radiation. This transmission path is exemplary of other transmitter paths (e.g., through the transmitter 22A) and, although not shown for clarity of illustration, a respective DAC and antenna may be dedicated to each transmitter path.

In reception, a radio-frequency signal from the antenna 48 is amplified, filtered and downconverted by the receiver 24 and passed through the summer 56 and ADC 54 as a baseband signal 144 to the tuner 132.

An exemplary process of calibrating and correcting the transceiver 20 is shown in the flow chart 160 of FIG. 4. In a first process step 162, calibration signals are sent through a transmitter (e.g., the transmitter 22 of FIG. 1). These calibration signals are preferably generated by the digital signal processor 50 of FIG. 1 so that they have a known level and can be swept over a known transmitter passband. In process step 164, the transmitter response is monitored. For example, signals from the detector 70 of FIG. 2 are coupled through the monitor MUX 84 of FIG. 2 and the MUX path 86 to the signal processor 50 of FIG. 1 for measurement.

In decision step 166, the transmitter response is compared to a predetermined range. If the response is out of range, it is corrected in process step 168. For example, the transmitter gain can be adjusted by the AGC circuit 72 of FIG. 2 in response to commands from the controller 60 of FIG. 1.

The transmitter responses that can be calibrated and corrected in with calibration signals from the signal processor 50 include transmitter gain over frequency, transmitter gain over temperature (using data from the temperature diode 88 of FIG. 2), transmitter gain over AGC range and AGC transfer function (using data from the AGC circuit 72 of FIG. 2) and frequency responses of the LO generator 73 of FIG. 2 (e.g., frequency response of a voltage-controlled oscillator and frequency steps of a phased-lock loop as function of commanded divide-by ratios). This process of calibration and correction can be conducted for each transmitter of the transceiver 20.

In process step 170, a signal from a transmitter is used in a mixing process with the calibration mixer 150 of FIG. 1. Because this transmitter has been calibrated and corrected, the signal levels sent over the signal line 149 of FIG. 1 have known levels. Because the conversion loss of the mixer 150 and the summer 152 are known, the receiver calibration signal levels coupled into the receiver 24 are also known. Either of the input signals to the mixer 150 can be used as a high-level signal to the mixer so that the mixer's output level is reduced from the other input signal by the mixer's conversion loss.

The frequency of the signals can be varied with commands from the controller 60 that cause frequency changes in either or both of the mixer input signals, i.e., the signal in signal line 149 from the transmitter 22 and the signal in signal line 151 from LO generator 106.

In process step 172, the receiver responses to the receiver calibration signals from the summer 152 are monitored. In decision step 174, the receiver response is compared to a predetermined range. If the response is out of range, it is corrected in process step 176. For example, the receiver gain can be adjusted by the AGC circuit 100 of FIG. 3 in response to commands from the controller 60 of FIG. 1.

The receiver responses that can be calibrated and corrected in this manner include receiver gain over frequency, receiver gain as a function of AGC signals (using data from the AGC circuit 100 of FIG. 3), receiver gain over temperature (using data from the temperature diode 118 of FIG. 3), receiver intermodulation distortion (using two mixer signals to the mixer 150 from the transmitter 22), receiver dynamic range, gain matching of different receivers, isolation of one receiver channel from another and gain and phase match of I/Q signals.

By monitoring frequency changes at the receiver output, the frequency response of phase-lock loops in the LO generator 106 can be measured as a function of divide-by ratios that are commanded from the controller 60. Also the frequency of a voltage-controlled oscillator in the LO generator 106 can be monitored as a function of commanded tuning voltages. In addition, all transmitter calibration signals can be interrupted and the receiver and ADC noise measured by the signal processor 50.

This process of calibration and correction can be conducted for each receiver of the transceiver 20. The calibration and correction of the transceiver ends at terminator 180 of flow chart 160.

The teachings of the invention can be applied to a variety of transmitters and receivers. For example, one of the receivers of the transceiver 20 of FIG. 1 is particularly structured for image rejection. This is accomplished by processing received signals with a pair of mixers whose local oscillator signals are in a quadrature relationship.

Figure 5:
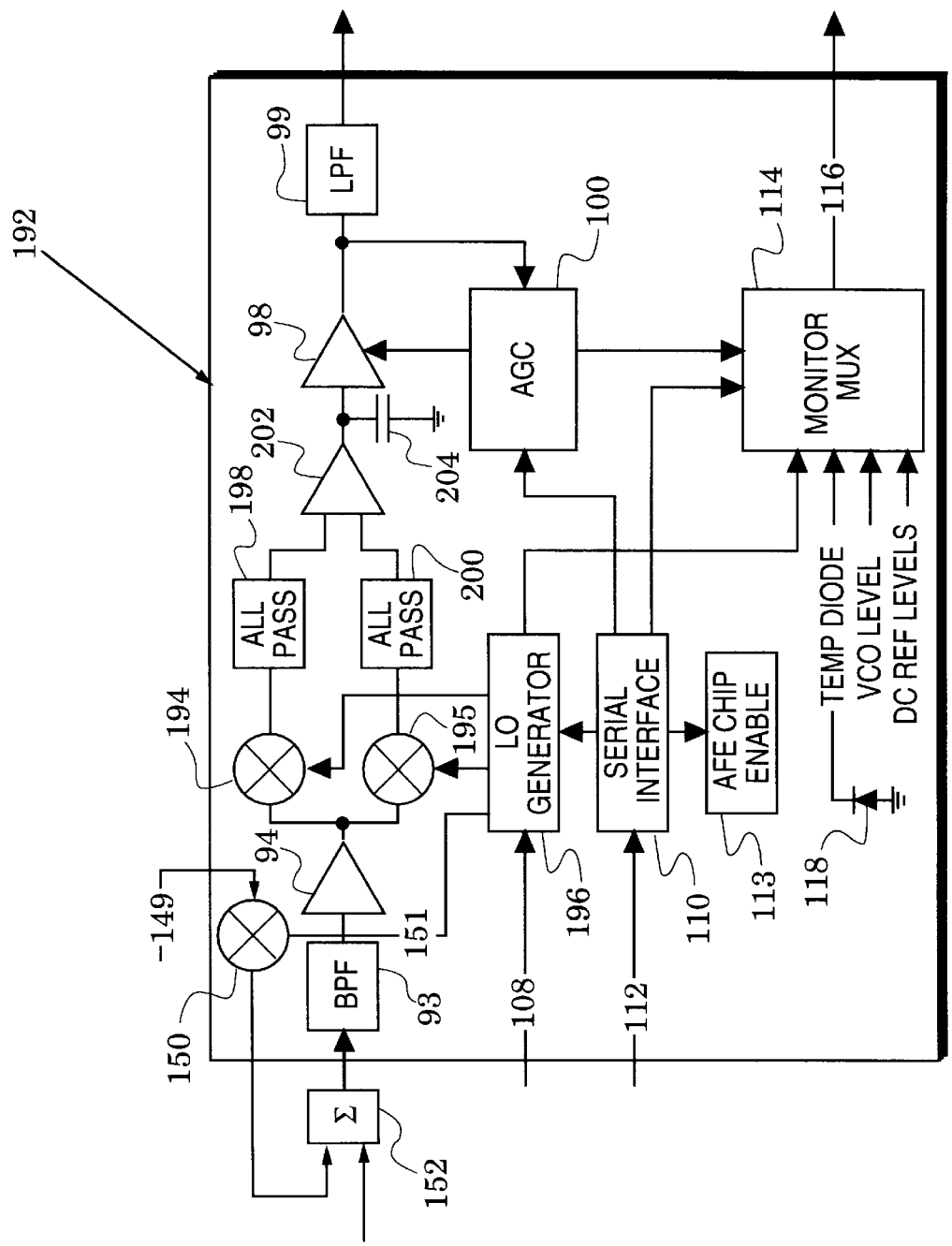
FIG. 5 is a block diagram of details of another receiver in the transceiver of FIG. 1.

This image-rejection receiver is the receiver 190 which is shown in FIGS. 1 and 5. The receiver 190 is similar to the receiver 24 with like elements indicated by like reference numbers. Similar to the receiver 24, a major portion of the receiver 190 is carried on an integrated circuit 192 which is detailed in FIG. 5. In contrast to receiver 24, the receiver 190 has a pair of parallel-arranged mixers 194 and 196 which receive local oscillator signals from a LO generator 198. The local oscillator signals from this generator are in a quadrature relationship, i.e., they have a 90 degree phase difference. The downconverted signals from the mixers 194 and 196 are respectively filtered in filters 198 and 200 and combined in a summing amplifier 202 whose output is filtered by a capacitor 204. Because of the quadrature relationship of the local oscillator signals, the outputs of the mixers 194 and 196 will add for an expected radio-frequency signal into the receiver 190 and cancel for signals at the image frequency, i.e., a frequency on the other side of the local oscillator frequency.

Calibration and correction of the receiver 190 is carried out in a manner similar to that described in flow chart 160 of FIG. 4. To facilitate this, the receiver 190 has a calibration mixer 150 and a summer 152 which are shown in FIG. 5 (for clarity of illustration, these elements are not shown in FIG. 1).

Transceivers of the invention can be adapted to operate at any communication frequency band, e.g., UHF, VHF, X-band and Ku-band. Although the invention has been described with reference to double-upconversion transmitters, double-downconversion receivers and image-rejection receivers, these are exemplary and the teachings of the invention can be practiced with any transmitters and receivers. Transceivers of the invention are particularly suited for calibration and correction of their performance parameters. Accordingly, they are structured to facilitate calibration of transmitter paths and receiver paths and are further structured to facilitate correction of parameters to bring them into predetermined performance ranges.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A self-calibrating, self-correcting transceiver, comprising:

one or more antennas;

at least one receiver coupled to one of said antennas and having a receiver output;

at least one transmitter coupled to one of said antennas and having a transmitter input;

a signal processor coupled to accept receive signals from said receiver output and configured to recover an output data stream from said receive signals, said signal processor also configured to convert an input data stream into a transmit signal and coupled to deliver said transmit signal to said transmitter input, said signal processor also configured to generate at least one transmitter calibration signal and couple said transmitter calibration signal into said transmitter input to create a calibrated transmitter signal;

a signal source which generates at least one mixing signal; and a calibration mixer having first and second mixer inputs respectively coupled to receive said calibrated transmitter signal and said mixing signal and having a mixer output coupled to said receiver;

said calibration mixer thereby inserting a receiver calibration signal into said receiver in response to said calibrated transmitter signal and said mixing signal.

2. The transceiver of claim 1, wherein:

said receiver includes a low-noise amplifier having a low-noise amplifier input and a low-noise amplifier output;

said antenna is coupled to said low-noise amplifier input; and said calibration mixer output is coupled to said low-noise amplifier output.

3. The transceiver of claim 1, wherein:

said transmitter includes a high-power amplifier having a high-power amplifier input and a high-power amplifier output;

said antenna is coupled to said high-power amplifier input; and said first mixer input is coupled to said high-power amplifier output.

4. The transceiver of claim 1, wherein said receiver includes:

first and second amplifier stages; and a frequency-conversion mixer coupled between said first and second amplifier stages;

and wherein said signal source is coupled to also supply a local oscillator signal to said mixer.

5. The transceiver of claim 1, wherein said receiver includes at least one gain-control stage.

6. The transceiver of claim 5, wherein said gain-control stage is a mixer.

7. The transceiver of claim 5, wherein said gain-control stage includes a pin diode.

8. The transceiver of claim 5, further including a controller configured to adjust the gain of said gain-control stage.

9. The transceiver of claim 1, wherein said receiver includes a multiplexer for communicating a plurality of monitor signals from said receiver.

10. The transceiver of claim 9, wherein said receiver includes a temperature-indicating diode which is coupled to said multiplexer for communicating a temperature of said receiver.

11. The transceiver of claim 9, wherein said receiver includes a detector which is responsive to said receiver output and which is coupled to said multiplexer for communicating a signal level of said receiver.

12. The transceiver of claim 1, wherein said transmitter includes at least one gain-control stage.

13. The transceiver of claim 12, wherein said gain-control stage is a mixer.

14. The transceiver of claim 12, wherein said gain-control stage includes a pin diode.

15. The transceiver of claim 12, further including a controller configured to adjust the gain of said gain-control stage.

16. The transceiver of claim 1, wherein said transmitter includes a multiplexer for communicating a plurality of monitor signals from said transmitter.

17. The transceiver of claim 16, wherein said transmitter includes a temperature-indicating diode which is coupled to said multiplexer for communicating a temperature of said transmitter.

18. The transceiver of claim 16, wherein said transmitter includes a detector which is responsive to said transmitter output and which is coupled to said multiplexer for communicating a signal level of said transmitter.

19. The transceiver of claim 1, further including a clock generator coupled to said signal processor.

20. The transceiver of claim 1, further including a controller and wherein said signal source is configured to generate a plurality of mixing signals whose frequency is selectable by said controller.

21. The transceiver of claim 1, wherein said signal processor is a digital signal processor and further including:
an analog-to-digital converter which couples said digital signal processor to said receiver output; and
a digital-to-analog converter which couples said digital signal processor to said transmitter input.

22. The transceiver of claim 1, wherein at least one receiver is a plurality of receivers; and each of said receivers is responsive to an enable signal;
and further including:
a controller which enables a selected one of said receivers via its enable signal; and
a summing amplifier coupled between the receiver output of each of said receivers and said signal processor.

23. A self-calibrating, self-correcting transceiver, comprising:
one or more antennas;
at least one receiver coupled to one of said antennas and having at least one receiver gain-control stage and a receiver output;
at least one transmitter coupled to one of said antennas, said transmitter having at least one transmitter gain-control stage and a transmitter input;
a signal processor coupled to accept receive signals from said receiver output and configured to recover an output data stream from said receive signals, said signal processor also configured to convert an input data stream into a transmit signal and coupled to deliver said transmit signal to said transmitter input, said signal processor also configured to generate at least one transmitter calibration signal and couple said transmitter calibration signal into said transmitter input to create a calibrated transmitter signal;
a signal source which generates a plurality of mixing signals;
a calibration mixer having first and second mixer inputs respectively coupled to receive said calibrated transmitter signal and said mixing signals and having a mixer output coupled to said receiver, said calibration mixer thereby inserting receiver calibration signals into said receiver in response to said calibrated transmitter signal and said mixing signals; and
a controller coupled to said signal source, said receiver and said transmitter to select any one of said mixing signals, the gain of said receiver gain-control stage and the gain of said transmitter gain-control stage.

24. The transceiver of claim 23, wherein:
said receiver includes a low-noise amplifier having a low-noise amplifier input and a low-noise amplifier output;
said antenna is coupled to said low-noise amplifier input; and said calibration mixer output is coupled to said low-noise amplifier output.

25. The transceiver of claim 23, wherein:
said transmitter includes a high-power amplifier having a high-power amplifier input and a high-power amplifier output;
said antenna is coupled to said high-power amplifier input; and
said first mixer input is coupled to said high-power amplifier output.

26. The transceiver of claim 23, wherein said receiver includes:
first and second amplifier stages; and
a frequency-conversion mixer coupled between said first and second amplifier stages;
and wherein said signal source is coupled to also supply a local oscillator signal to said mixer.

27. The transceiver of claim 23, wherein:
said receiver includes a receiver multiplexer for communicating a plurality of monitor signals from said receiver; and
said transmitter includes a transmitter multiplexer for communicating a plurality of monitor signals from said transmitter.

28. The transceiver of claim 27, wherein said receiver includes:
a temperature-indicating diode which is coupled to said receiver multiplexer for communicating a temperature of said receiver; and
a detector which is responsive to said receiver output and which is coupled to said multiplexer for communicating a signal level of said receiver; and wherein said transmitter includes:
a temperature-indicating diode which is coupled to said transmitter multiplexer for communicating a temperature of said transmitter; and
a detector which is responsive to said transmitter output and which is coupled to said multiplexer for communicating a signal level of said transmitter.

29. The transceiver of claim 23, wherein said signal processor is a digital signal processor and further including:
an analog-to-digital converter which couples said digital signal processor to said receiver output; and
a digital-to-analog converter which couples said digital signal processor to said transmitter input.

30. The transceiver of claim 23, wherein at least one receiver is a plurality of receivers; and each of said receivers is responsive to a respective enable signal generated by said controller;
and further including a summing amplifier coupled between the receiver output of each of said receivers and said signal processor.

31. A method of calibrating and correcting transmitter gain and receiver gain in a transmitter and a receiver of a transceiver, comprising the steps of:
sending transmitter calibration signals through said transmitter;
monitoring the transmitter response to said transmitter calibration signals;
correcting, if necessary, said transmitter gain to bring said transmitter response into a selected range;
mixing a signal from said transmitter with a mixing signal to generate and inject receiver calibration signals into said receiver;
monitoring the receiver response to said receiver calibration signals; and correcting, if necessary, said receiver gain to bring said receiver response into a selected range.

32. The method of claim 31, further including the step of monitoring the temperatures of said transmitter and said receiver.

33. The method of claim 31, further including the step of changing the frequency of said mixing signal to vary the frequency of said receiver calibration signals.

* * * * *